United States Patent
Betz et al.

(10) Patent No.: US 6,712,394 B2
(45) Date of Patent: Mar. 30, 2004

(54) BELT TENSIONER

(75) Inventors: Hans-Peter Betz, Böbingen (DE); Wolf-Dieter Hönl, Böbingen (DE)

(73) Assignee: TRW Occupant Restraint Systems GmbH & Co. KG, Alfdorf (DE)

( * ) Notice: Subject to any disclaimer, the term of this patent is extended or adjusted under 35 U.S.C. 154(b) by 0 days.

(21) Appl. No.: 10/060,132

(22) Filed: Jan. 30, 2002

(65) Prior Publication Data

US 2002/0113425 A1 Aug. 22, 2002

(30) Foreign Application Priority Data

Feb. 16, 2001 (DE) .................... 201 02 758 U

(51) Int. Cl.⁷ .................... B60R 22/28; B60R 22/46
(52) U.S. Cl. .................... 280/805; 280/806; 297/472; 297/480; 60/638; 188/374
(58) Field of Search .................... 280/806, 805; 297/472, 480; 60/638, 632; 188/374

(56) References Cited

U.S. PATENT DOCUMENTS

| 4,258,934 A | * | 3/1981 | Tsuge et al. | ............ | 280/806 |
| 4,458,921 A | | 7/1984 | Chiba et al. | | |
| 5,340,152 A | | 8/1994 | Fohl | | |
| 5,350,194 A | * | 9/1994 | Fohl | ............ | 280/806 |
| 5,454,622 A | * | 10/1995 | Demopoulos | ............ | 188/374 |
| 6,024,383 A | | 2/2000 | Fohl | | |
| 6,135,564 A | | 10/2000 | Wier | | |
| 2001/0035643 A1 | * | 11/2001 | Mueller | ............ | 280/806 |

FOREIGN PATENT DOCUMENTS

| DE | 2349891 A1 | 4/1975 |
| DE | 2411702 A1 | 9/1975 |
| DE | 29718661 U1 | 4/1998 |
| EP | 0558963 A2 | 9/1993 |
| EP | 0568327 A2 * | 11/1993 |

* cited by examiner

Primary Examiner—Peter C. English
(74) Attorney, Agent, or Firm—Tarolli, Sundheim, Covell & Tummino L.L.P.

(57) ABSTRACT

A tensioner for a safety belt includes a cylinder, a piston which is slidably arranged within the cylinder, and a traction transfer element which is connected with the piston to transfer a movement of the piston to the safety belt. The tensioner further includes a drive which may exert a driving force on the piston to tension the safety belt. The piston is provided with a deformation element which the traction transfer element engages.

6 Claims, 3 Drawing Sheets

BELT TENSIONER

TECHNICAL FIELD

The present invention relates to a tensioner for a safety belt.

BACKGROUND OF THE INVENTION

Known safety belt tensioners usually comprise a cylinder, a piston slidably arranged within the cylinder, a traction transfer means which is connected with the piston to transfer the movement of the piston to the safety belt, and a drive which may exert a driving force on the piston to tension the safety belt. Such belt tensioners serve for rapidly winding up, if activated, a possibly existing belt slack, so that the safety belt may fully develop its protective effect for the occupant. In order to keep, in the case of restraint, the stress for the vehicle occupant as little as possible, the safety belt device must be able to absorb as much kinetic energy of the vehicle occupant as possible. For this purpose, what is called force limiters are provided which convert the absorbed energy into plastic deformation. Such a force limiter is realized e.g. in the belt tensioner described in DE 297 18 661. In this case, the piston of the belt tensioner has a conical shape, so that when the piston is pulled back by the traction transfer means it forces rolling elements against the cylinder wall. These elements deform the wall plastically when the piston is pulled back along the previously traveled tensioning distance. However, this kind of force limitation can only function if the belt tensioner was actuated and the piston was moved out of its rest position, so that a distance for deforming the cylinder wall is available. If there was no belt slack at the time of actuation or if the belt tensioner was not actuated at all, the piston therefore still being in the rest position, such means for force limitation will remain ineffective.

BRIEF SUMMARY OF THE INVENTION

Thus, it is the object of this invention to provide a belt tensioner which enables force limitation even in the non-actuated condition and in which the tensioning distance and the distance usable for force limitation are independent of each other.

This object is achieved by a tensioner which comprises a cylinder, a piston which is slidably arranged within the cylinder, and a traction transfer means which is connected with the piston to transfer a movement of the piston to the safety belt. The tensioner further comprises a drive which may exert a driving force on the piston to tension the safety belt. The piston is provided with a deformation element which the traction transfer means engages. On the one hand, the deformation element serves as a connection between the piston and traction transfer means and, on the other hand, it may be deformed plastically by a force acting on the traction transfer means so as to act as a force limiter. The deformation element may fulfill this function irrespective of the position of the piston so as to ensure the force limiting function even if the belt tensioner is not actuated.

Further advantageous designs of the invention will be apparent from the following disclosure.

DETAILED DESCRIPTION OF THE PREFERRED EMBODIMENT

Figure 1:
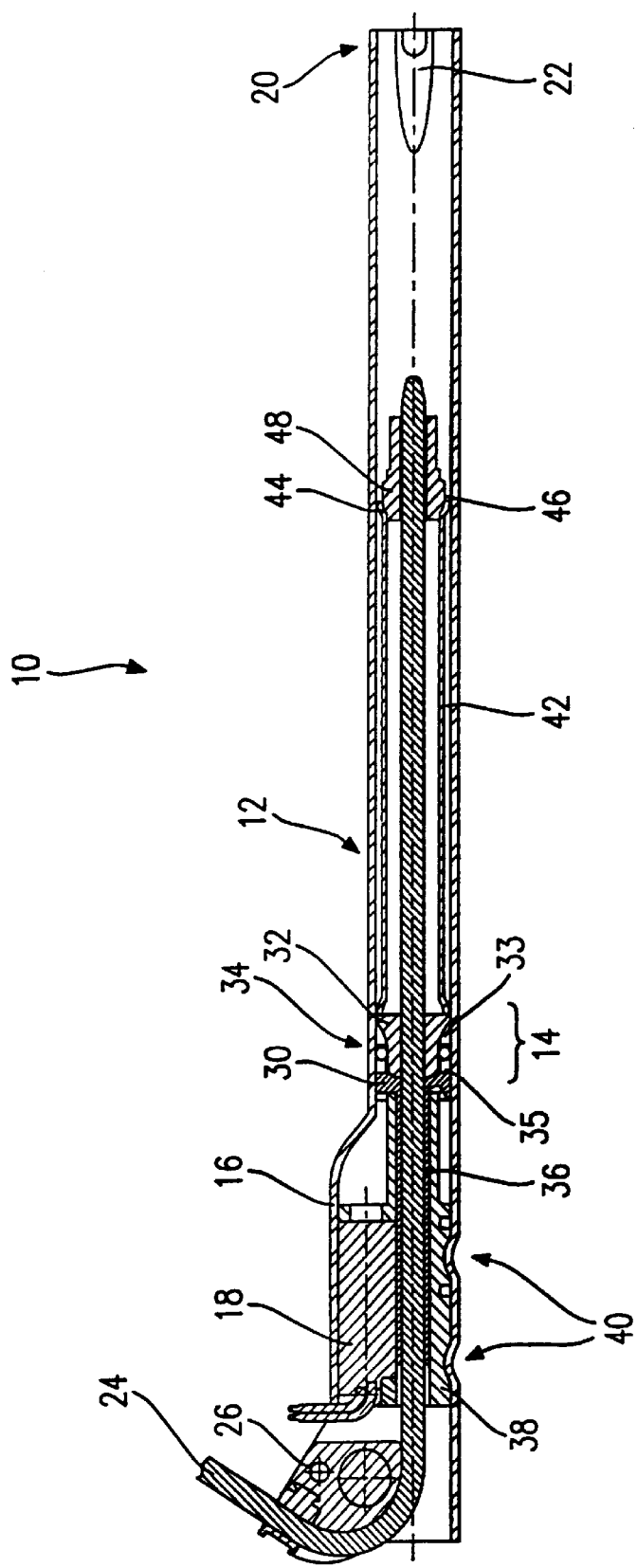
FIG. 1 shows a cross-section through a tensioner according to the invention.

The belt tensioner 10 shown in FIG. 1 comprises a cylinder 12 within which a piston 14 is slidably arranged. The cylinder 12 has a drive end 16 where its cross-section is widened to receive a drive in the form of a gas generator 18. The opposite open end 20 of the cylinder 12 is tapered by an indentation 22 to prevent the piston 14 from escaping. A traction transfer means in the form of a steel rope 24 extends along the longitudinal axis of the cylinder 12 through a bore in the piston 14. At the drive end 16 of the cylinder, the traction cable 24 is guided around a deflector element 26 and leaves the cylinder 12. The deflected end of the traction cable 24 may be connected with a belt engaging means (not shown), e.g. a belt buckle or a belt deflector, which in turn engages a safety belt.

The piston 14 consists of a drive plunger 30 which faces the generator 18 and of a cone 32 whose end of smaller diameter adjoins the drive plunger 30. The drive plunger 30 seals slidably against the wall of cylinder 12, so that the piston 14 can be moved to the free end 20 by the gases generated by the generator 18. Rolling elements 34 which may be caught between the piston and the inner wall of the cylinder 12 are disposed in a cavity 33 between cone 32 and cylinder 12. The rolling elements 34 are guided by fingers 35 which protrude from the drive plunger 30 into the cavity 33. In this way, the piston 14 is provided with a return stop preventing the piston from being moved back into its rest position after the tensioning process. In that the cone 32 forces the rolling elements 34 against the inner wall of the cylinder 12, the piston 14 is caught in the cylinder 12. A protective sleeve 36 adjoins the free end of the drive plunger 30. It protects the rope 24 from the hot combustion gases of the generator 18. A sealing member 38 is joined with the cylinder 12 by pressing (see indentation points 40 in FIG. 1) and seals the interior space of the cylinder at the generator end 16.

A first end of a deformation tube 42 is connected with the cone 32 of the piston 14. The second end of the deformation tube 42 faces the free end 20 of the cylinder 12 and is provided with a widened portion 44. The traction cable 24 extends through the deformation tube 42, a substantially cylindrical displacement member 46 being pressed onto the free end of the traction cable 24 protruding from the deformation tube 42. The displacement member 46 is provided with an advantageously spherical thickened portion 48 which is symmetric with respect to its longitudinal axis. The diameter of this thickened portion is somewhat larger than the inner diameter of the deformation tube 42. The displacement member 36 engages the widened portion 44 of the deformation tube 42 via its thickened portion 48, the displacement member being centered at the end of the deformation tube 42 by the symmetric shape of the thickened portion 48.

Figure 3:
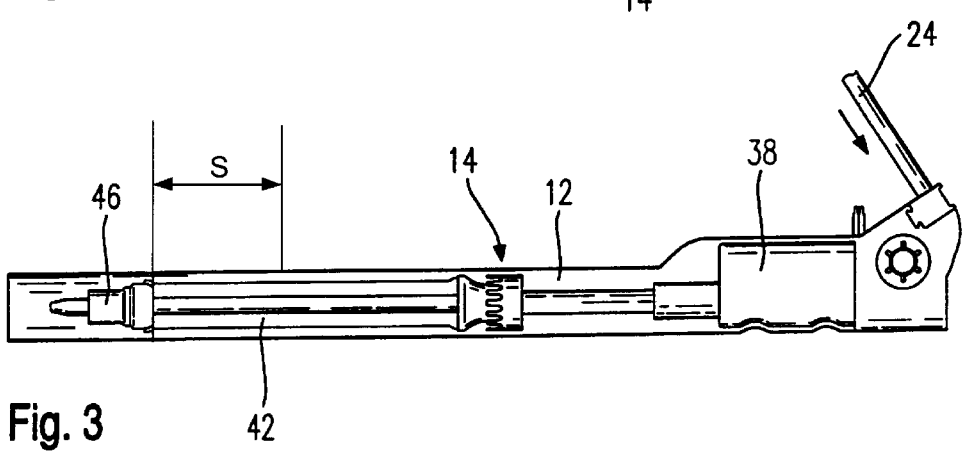
FIG. 3 shows a partially cut view of the tensioner of FIG. 1 in its actuated condition.
Figure 4:
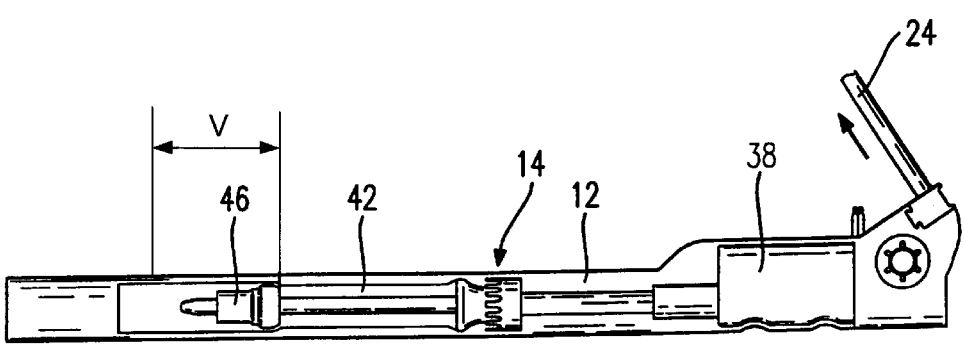
FIG. 4 shows a partially cut view of the tensioner of FIG. 1 in its actuated condition after a force limiting deformation.

When the belt tensioner 10 is actuated, the piston 14 is moved by the expanding combustion gases of the gas generator 18 towards the free end 20 of the cylinder by a tensioning distance S (FIG. 3). In this case, the piston 14 exerts via the cone 32, the deformation tube 42 and the displacement part 46 a tensile force on the traction cable 24 which can tension the safety belt via the belt engaging means. In a subsequent restraint case, a tensile force is exerted on the rope 24 due to the kinetic energy of the vehicle occupant. Depending on the deceleration of the vehicle this force may exceed the driving force applied by the generator 18 during the tensioning process. In this case, the tensile force resulting from the deceleration causes the displacement member 46 to penetrate the deformation tube 42 while plastically deforming it (FIG. 4) and to travel inside this tube the deformation distance V which is fully independent of the tensioning distance S. In this case, the return stop in the piston 14 prevents the latter from being pulled back. The penetration of the displacement member 46 enables the yielding of the traction cable 24 and thus an effective force limitation of the restraint force on the vehicle occupant.

Figure 2:
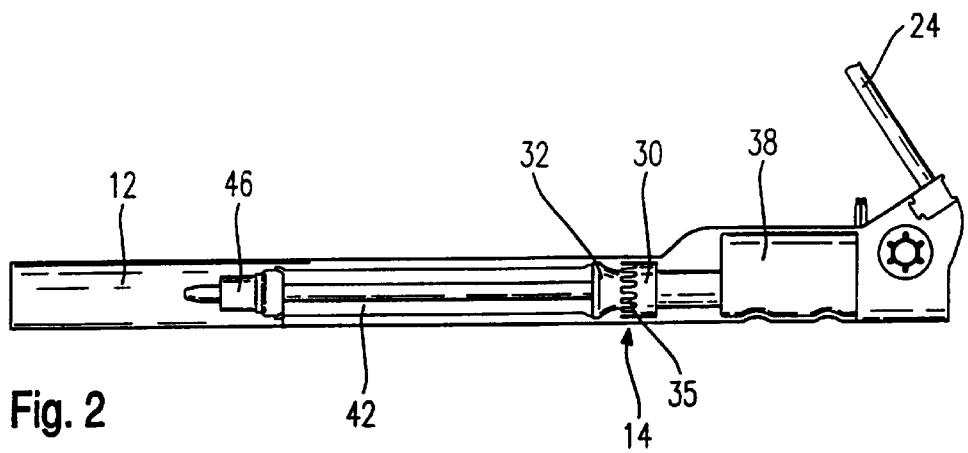
FIG. 2 shows a partially cut view of the tensioner of FIG. 1 in its non-actuated condition.
Figure 5:
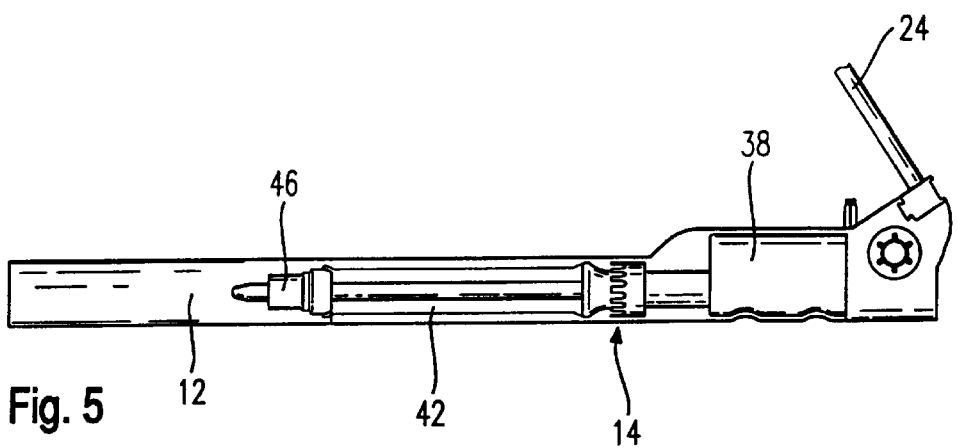
FIG. 5 shows a partially cut view of the tensioner of FIG. 1 in its non-actuated condition.
Figure 6:
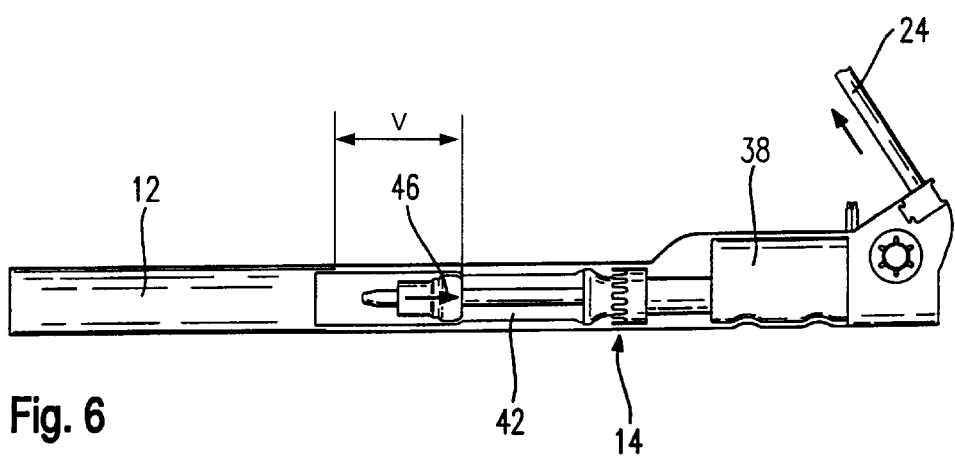
FIG. 6 shows a partially cut view of the tensioner of FIG. 1 in its non-actuated condition after a force limiting deformation.

As shown in FIGS. 5 and 6, force limitation by penetration of the displacement member 46 into the deformation tube 42 is also effective when the belt tensioner 10 is not actuated, i.e. when the piston is still in its starting position (as in FIG. 2). The full deformation distance V can be traveled in this case as well.

Thus, the belt tensioner according to the invention offers force limitation both after the actuation of a tensioning process and in the non-actuated condition. A deformation distance V is available for this force limitation, which is independent of the final position of the piston 14. The deformation distance is thus not limited by a possibly traveled tensioning distance either.

A very space-saving design of the belt tensioner is possible when arranging the deformation tube 42 within the cylinder 12, which does not require much more space than a conventional system. The development according to the invention therefore enables the cost-effective use of already known components, e.g. for the drive. As compared to a conventional belt tensioner only few additional components are necessary.

The invention is, of course, not limited to the described development, in particular of the deformation tube and the displacement member. It is essential for the deformation member to be stable enough to withstand the driving force of the drive during the tensioning process and to be deformable by the restraint force.

What is claimed is:

1. A tensioner for a safety belt, said tensioner comprising:
   a cylinder,
   a piston which is slidably arranged within said cylinder,
   a traction transfer means which is connected with said piston to transfer movement of said piston to said safety belt, and
   a drive for exerting a driving force on said piston to tension said safety belt,
   said piston including a deformation means which said traction transfer means engages,
   said deformation means being stable enough to withstand being plastically deformed when said driving force acts on said traction transfer means and being plastically deformed when a restraint force exceeding said driving force is acting on said traction transfer means, said deformation means comprises a deformation tube connected with said piston and a displacement member connected with said traction transfer means, said displacement member penetrating said deformation tube when a restraint force exceeding said driving force acts on said traction transfer means.

2. The tensioner according to claim 1, wherein said deformation tube includes a first end attached to said piston and a second end comprising a widened portion, said displacement member engaging said widened portion in a non-deformed condition.

3. The tensioner according to claim 1, wherein said piston includes a return stop preventing said piston from being moved back into a rest position after a tensioning process.

4. The tensioner according to claim 1, wherein said return stop contains several blocking members, said blocking members being jammed between said piston and an inner wall of said cylinder after a tensioning process.

5. The tensioner according to claim 1, wherein said traction transfer means extends through said deformation tube and through a bore in said piston.

6. The tensioner according to claim 1, wherein said traction transfer means is a traction cable.

* * * * *

UNITED STATES PATENT AND TRADEMARK OFFICE
CERTIFICATE OF CORRECTION

PATENT NO. : 6,712,394 B2
DATED : March 30, 2004
INVENTOR(S) : Hans-Peter Betz et al.

It is certified that error appears in the above-identified patent and that said Letters Patent is hereby corrected as shown below:

Column 4,
Line 35, after "claim" change "1" to -- 3 --.

Signed and Sealed this

Twenty-eighth Day of September, 2004

JON W. DUDAS
*Director of the United States Patent and Trademark Office*